Sept. 22, 1925.

C. H. DAHMEN 1,554,261

LID FOR CULINARY ARTICLES

Filed June 6, 1924

Inventor
Carl H. Dahmen
By Frank S. Appleman
Attorney

Patented Sept. 22, 1925.

1,554,261

UNITED STATES PATENT OFFICE.

CARL H. DAHMEN, OF ALLENTOWN, PENNSYLVANIA.

LID FOR CULINARY ARTICLES.

Application filed June 6, 1924. Serial No. 718,344.

*To all whom it may concern:*

Be it known that I, CARL H. DAHMEN, a citizen of the Republic of Germany, and resident of Allentown, in the county of Lehigh and State of Pennsylvania, U. S. A., have invented certain new and useful Improvements in Lids for Culinary Articles, of which the following is a specification.

This invention relates to culinary articles and particularly to covers for pots, pans and the like.

It is an object of this invention to produce a cover for a culinary article, which cover is in the nature of a lid that may be lifted for the purpose of observing the process of cooking, or for the purpose of removing the contents of the receptacle.

It is the purpose of the inventor to provide lids which may be used on kettles, frying pans and the like, and for the purpose of generically describing the invention, it will be referred to as for use on a culinary article and this term is intended to mean any pan, kettle or receptacle intended for the reception of food or other articles being cooked.

It is a further object of this invention to provide a lid for a culinary article, which lid may be readily manipulated in opening and closing the same, the said lid including novel means by which it may be anchored on a culinary article in order that it will not be displaced or disarranged with respect to the culinary article while it is being manipulated.

It is a still further object of this invention to produce a lid which is close fitting in order that steam and vapors may not readily escape.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which:—

Figure 1:
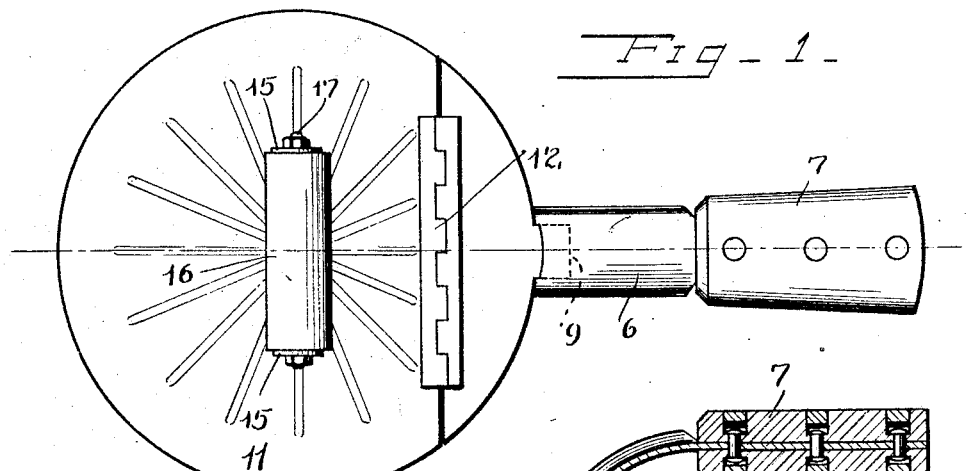
Figure 1 illustrates a plan view of a culinary article with a lid thereon embodying the invention.
Figure 2:
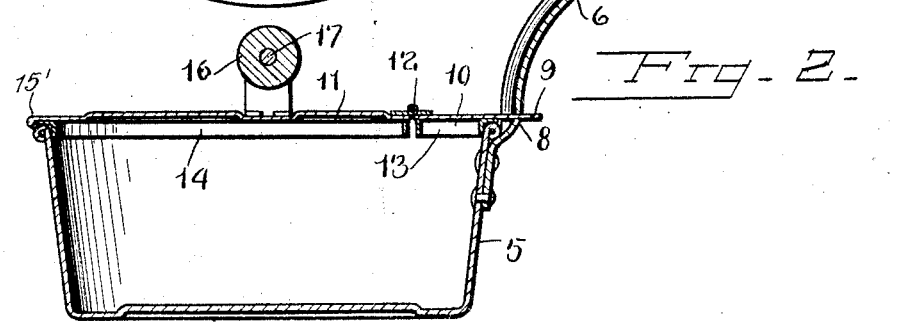
Figure 2 illustrates a sectional view on the line 2—2 of Fig. 1.
Figure 3:
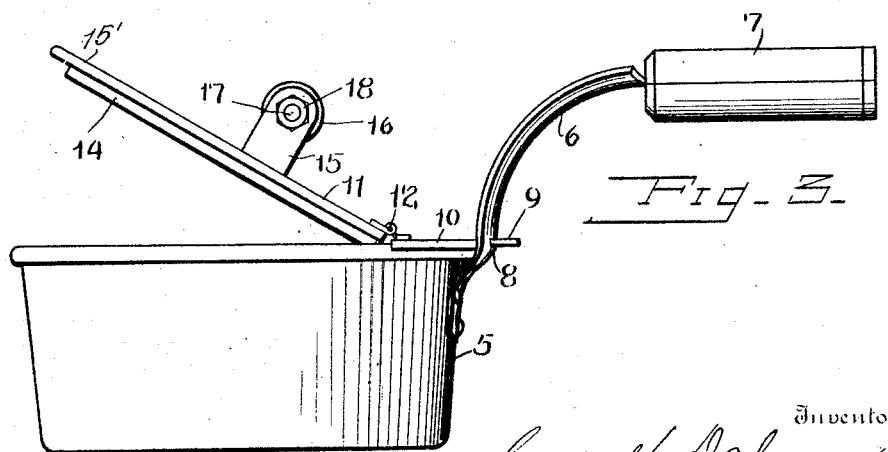
Figure 3 illustrates a view in elevation showing the lid in its open position.

In these drawings, 5 denotes a culinary article having a handle 6 and a hand grasp 7, which latter is intended to insulate the handle and prevent the grip from becoming excessively hot.

The handle, in the present embodiment of the invention, has a slot 8, through which an ear or lug 9 of a stationary section 10 of the lid may extend. The section 11 of the lid is intended to be movable with relation to the stationary section 10, and therefore these sections are connected by hinges 12. The stationary section as well as the movable section each has a depending flange, the flange 13 of the stationary section 10, as well as the flange 14 of the section 11, being of a depth and configuration to rather closely engage the inner surface of the culinary article at its mouth, whereas the said sections have ledges or flanges such as 15' which rest on the upper edge of the culinary article to produce a relatively tight joint between the lid and the said culinary article.

The ear or lug 9 extends through the aperture of the handle and hence the movable section of the lid may be manipulated without liability of the rear or stationary portion 10 of the lid being moved or displaced.

The movable section of the lid has posts 15 applied to its upper surface and secured thereto in any suitable way, the said posts being spaced apart to support a handle 16, it being shown that the handle has a rod 17 extending through it and that the said rod projects through the posts where they are secured in any suitable manner, as by nuts 18, although other means may be employed for retaining the parts in their assembled relation.

It has been found in practice that a cover of the character indicated may be of different sizes, appropriate for use in connection with large or small culinary articles, and the inventor, therefore, does not wish to be limited with respect to the proportions or the exact configuration in plan of the lid.

It will be apparent from the foregoing description and it will be obvious that the cover embodying the invention will prove advantageous in use, in that there will be no danger that the fingers of the operator or cook will be burned, and the interior flange will prevent dripping of water or grease on the stove. The interior flange will also prevent the contents of the receptacle from floating over the edge of the receptacle on which the cover is used and avoid fouling the top of the stove or the floor. It will also be apparent that the lid may be readily disconnected for the purpose of cleaning or washing the utensil.

I claim:

In a culinary article having a handle, the said handle having a slot approximately in line with the upper edge of the receptacle, a lid comprising a section having an ear adapted to enter the slot of the handle, a lid section hinged to the first mentioned section, depending flanges on the first and second mentioned sections, respectively, adapted to engage the inner wall of the receptacle, and a handle for operating the movable section.

CARL H. DAHMEN.